May 19, 1942. J. R. MANNING 2,283,860
WHEEL STRUCTURE
Filed Aug. 31, 1940 2 Sheets-Sheet 2
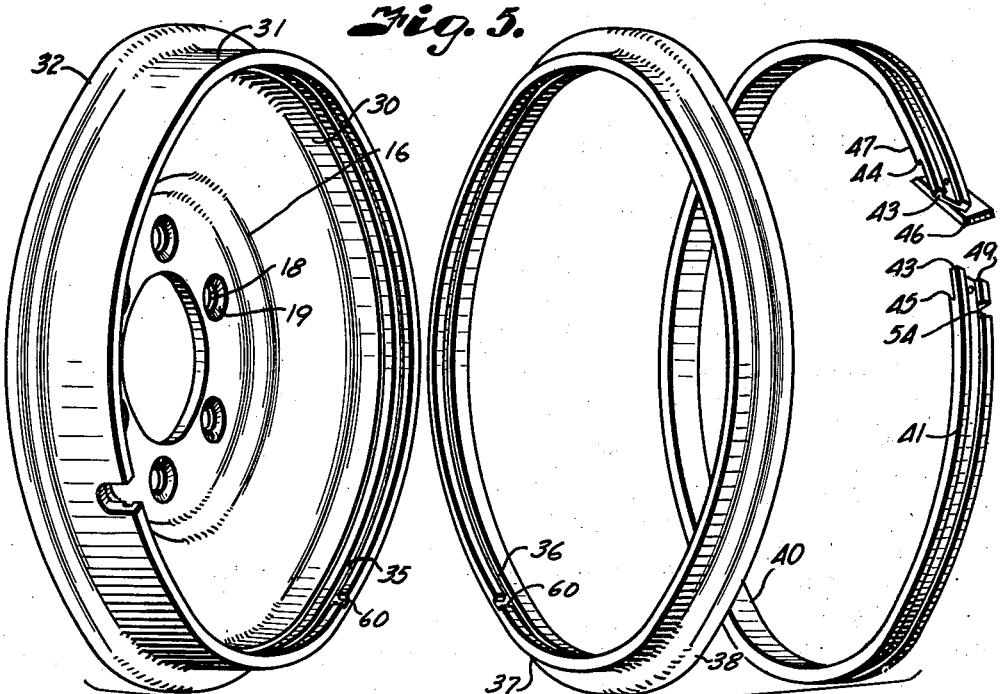
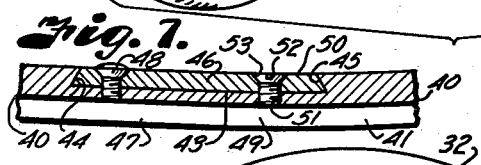
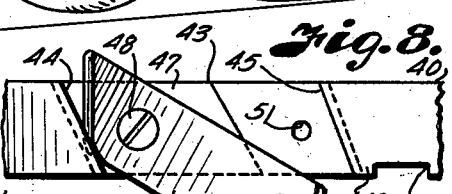
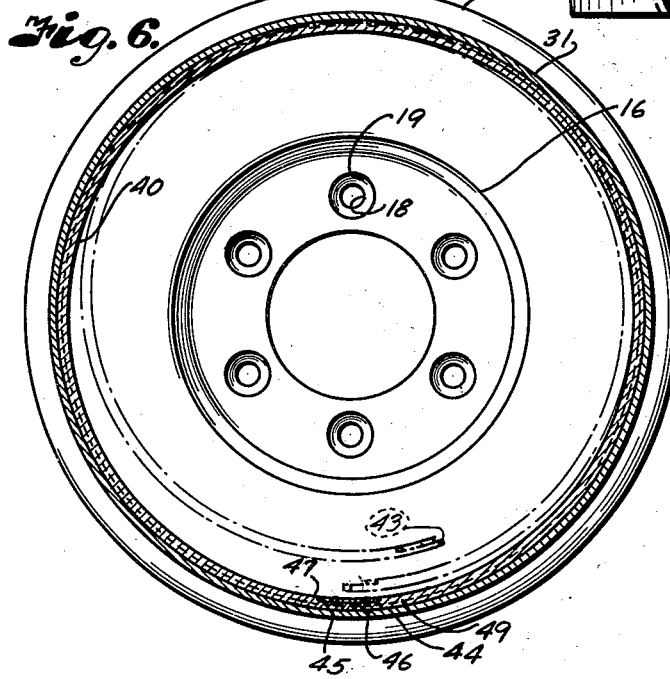
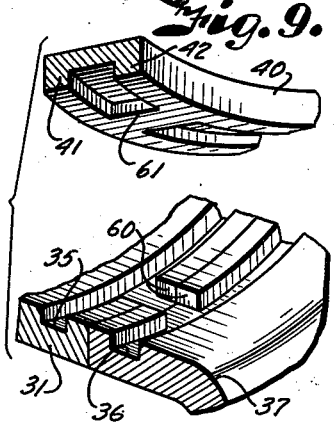
INVENTOR
John R. Manning.
BY
ATTORNEY Patented May 19, 1942

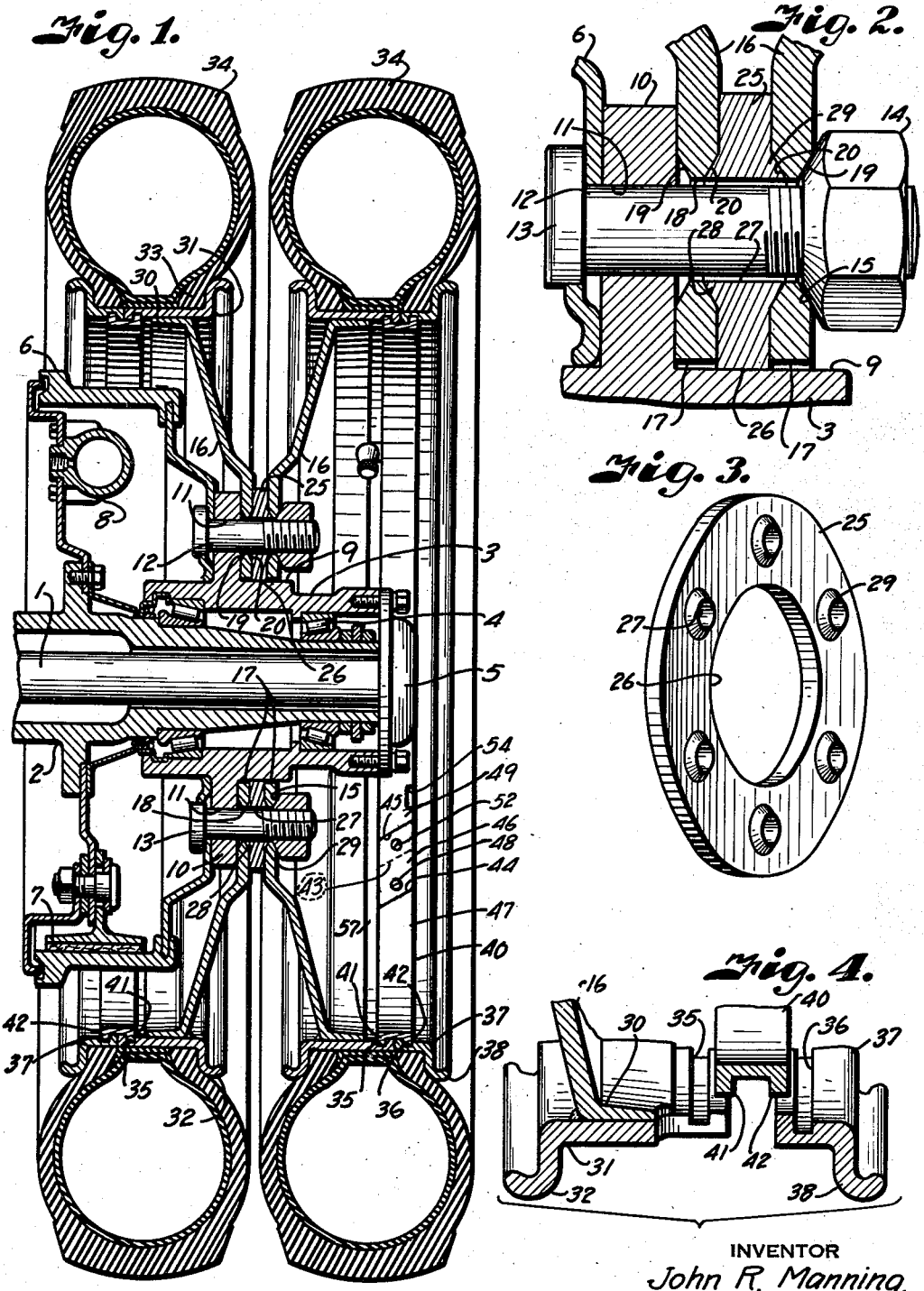

2,283,860

UNITED STATES PATENT OFFICE 2,283,860

WHEEL STRUCTURE

John R. Manning, Santa Fe, N. Mex., assignor of one-fourth to Sue Winston, and one-fourth to Martha Donaldson, both of Santa Fe, N. Mex.

Application August 31, 1940, Serial No. 355,075

4 Claims. (Cl. 301—36)

This invention relates to wheel and rim structures and more particularly to single or dual wheel and rim structures for automotive vehicles, the principal objects of the present invention being to provide a convenient, relatively economical and highly efficient wheel and rim structure.

Other objects of the invention are to provide for facilitating mounting the wheel structure on axle and like housings; to provide for centering and locking the wheel structure relative to its mounting; to provide separable rim sections on the wheel structure for facilitating mounting and removing a tire from the rim of the wheel structure; to provide for locking the rim sections together in such a manner as to hold a tire in desired position; to provide against creeping of the rim locking arrangements; to provide for readily locking and unlocking the rim locking device; to prevent sticking and corrosion between the relative parts of the wheel and rim structure and a tire therein; and to provide improved elements and arrangements thereof in a wheel structure of the character and for the purpose noted.

In accomplishing these and other objects of the present invention, I have provided improved details of structure, the preferred form of which is illustrated in the accompanying drawings wherein:

Figure 1 is a vertical cross section through a wheel structure embodying the features of the present invention showing its relation to a support therefor.

Figure 2 is a detail vertical cross section through a portion of the wheel structure adjacent its axis to more clearly illustrate the arrangement of mounting the wheel structure on a support.

Figure 3 is a detail perspective view of a locking ring for mounting and centering the wheel structure on an axle housing.

Figure 4 is a detail fragmentary perspective view of portions of the wheel structure at its outer periphery particularly illustrating the relation of the separable rim sections and locking ring.

Figure 5 is a perspective view of the wheel structure showing a separable rim section and locking ring in disassembled spaced relation thereto.

Figure 6 is a vertical cross section through the wheel structure illustrated in Figure 1, one of the locking rings being shown in expanded rim locking condition, and the other ring being shown in dotted lines in collapsed, rim unlocking condition.

Figure 7 is a detail vertical cross section through a portion of the locking ring at the collapsible or wedged section thereof.

Figure 8 is a fragmentary plan view of the locking ring showing the lock in partially unlocked condition.

Figure 9 is a detail fragmentary perspective view of portions of the rim and locking ring parts of the wheel structure, particularly illustrating the arrangement which precludes creeping of the ring relative to the rim.

Referring more in detail to the drawings:

1 designates an automotive vehicle axle having a conventional housing 2 that supports a hub 3 as by roller bearings 4, the axle preferably being connected with the hub as by a cap 5 to drive the hub. A conventional brake drum housing 6 provided with braking shoes 7 operated by conventional hydraulic mechanisms 8 may also be provided in association with the axle and housing therefor.

The hub 3 is preferably provided with an annular shoulder 9 that terminates at its inner end in an annular outwardly extending flange 10 that is provided with spaced apertures 11 for passing fastening devices 12 such as the bolt shown, the bolts being provided with heads 13 and threaded opposite ends to receive nuts 14 that are preferably provided with tapered inner ends 15.

While the present wheel structure may be of single type, it is shown for convenience of illustration to be of dual type, the wheel structure preferably consisting of a body member 16 having a central axial opening 17 that fits about the hub 3 and is of approximately the diameter of the hub. The body member is also preferably provided with spaced apertures 18 of a number equal to the apertures 11 in the hub flange 10, the apertures 18 being bounded by inwardly tapered walls 19 and 20 on opposite sides of the apertures.

Where the dual type wheel structure is employed the second or outer wheel is preferably a duplicate of the first or inner wheel and, as shown in Figure 2, the tapered end 15 of each nut 14 engages the tapered outer wall 19 of the aperture bounding portions of the wheel in such a manner as to center the wheel relative to the bolt and form a bearing support therefor.

25, Figure 3, designates a locking ring which is employed in dual type wheel structures in accordance with the present invention, the locking ring having a central aperture 26 that snugly fits about the hub shoulder 9. The locking ring 25 is also provided with a series of spaced apertures 27 that are bounded by outwardly extending tapered projections 28 and 29 on opposite sides thereof, the projections 28 and 29 being adapted to fit the adjacent inwardly tapered portions of the aperture bounding portions of the wheel structure, as particularly shown in Figure 2, and thus center, lock and support the wheel structure on the hub.

The wheel structure body member 16 projects radially outwardly from the central axial portion thereof and terminates in a laterally turned flange 30 that may be secured as by welding or the like to an inner rim portion 31 having a suitable bead 32 for mounting the inner supporting flange 33 of a pneumatic or like tire 34. The rim section 31 is preferably provided with an annular groove 35, Figure 4, adjacent its outer edge, the groove corresponding to and being adapted to be spaced inwardly from a preferably similar groove 36 in an outer separable rim section 37. The rim section 37 is also provided with a suitable bead 38 for substantially the same purpose as the bead 32 on the inner rim section.

40, Figure 5, designates a normally expansible locking ring for connecting the separable rim sections 31 and 37, the locking ring being provided with spaced annular flanges 41 and 42 at its opposite sides and on its outer face. The flanges 41 and 42 are spaced in accordance with the distance between the grooves 35 and 36 on the inner faces of the separable rim sections 31 and 37 in such a manner that the flanges seat in the grooves and hold the rim sections together.

In order to provide for applying the locking ring to the separable rim sections and removing the same therefrom, the locking ring 40 is split to allow its contraction as shown in Fig. 6 for fitting it within the wheel and rim portions. The split is preferably diagonal relative to the side edges of the ring as shown at 43, the portions of the ring adjacent the split being cut out on the inner face of the ring to form alignable recesses 44 and 45. A section 46 consisting of a plate shaped similarly to the combined recesses 44 and 45 normally forms a continuation of the locking ring. One end of the section 46 is pivoted in the recess 44 in the end 47 of the locking ring as by the fastening device 48. The other end 49 of the locking ring section, as cut away at 45, provides a seat for the end 50 of the locking ring section 46. A recess 51 is also provided in the end 49 of the locking ring to seat a locking device 52 on the ring locking section 46. A countersunk aperture 53 is also provided in the end 50 of the ring locking section that is alignable with the recess 51 to provide for insertion of the fastening device 52 to hold the locking ring in expanded condition. A niche 54 or the like is also provided in an edge of the locking ring for the insertion of a suitable tool whereby the ring portions may be easily pried apart.

In order to preclude creeping of the locking ring relative to the separable rim sections, the rim sections are preferably provided with transverse grooves 60 that are alignable and preferably communicate the grooves 35 and 36 in the rim sections. The locking ring is also preferably provided with a boss 61 and extends transversely between the flanges 41 and 42, the boss 61 being approximately of the width of the groove 60 in order that interengagement may be effected therebetween to accomplish the desired result of precluding movement of the locking ring relative to the rim while the wheel is in motion.

It is preferable to construct the present wheel and rim structure of certain of the common alloys in order to prevent corrosion and also to prevent sticking between the relative parts of the wheel and rim structure and/or a tire thereon.

The operation of a wheel and rim structure constructed as described is as follows:

Assuming the rim sections of the wheel structure to have been separated, pneumatic or other suitable tires may be applied to the inner rim sections 31, whereupon the outer rim sections may be positioned adjacent the inner rim sections. The locking rings 40 when in their normal condition shown in Figure 5, must be suitably contracted to the condition shown in Fig. 6, in order that a locking ring may be positioned within the inner periphery of both rim sections. Expansion of the locking ring or rings brings it into engagement with the rim sections, the flanges 41 and 42 of the locking rings seating in the flanges 35 and 36 of the rim sections and the bosses 61 on the locking rings seating in the grooves 60 in the rim sections.

The locking ring portions having been aligned, as shown in Fig. 8, the section 46 may be pivoted on the pin 48 into wedging engagement with the opposite recessed portion 45 of the locking ring. The fastening device 52 may then be applied to the recesses 53 and 51 to lock the ring in outwardly wedged expanded condition.

A single wheel structure may be applied to the shoulder 9 of the hub 3 whereupon the ring 25 is applied to the hub and the apertures of the hub, wheel and ring aligned to center the wheel. Another wheel may then be applied to the hub and the apertures thereof aligned with the apertures in the ring to center the second or outer wheel. The hub bolts are preferably fixed in the hubs, either by a press fit or made stationary by nut and lock on the inside of the hub, substantially as shown. The tapered nuts may then be applied to the bolts for mounting, centering and locking the dual wheel structure in desired position.

A reversal of the operation just described may be employed to remove a rim section, tire, a wheel or plurality of wheels from an automotive vehicle.

It is apparent, therefore, that a convenient, economical and efficient wheel structure has been provided by the present invention in which the wheels are readily centered and locked relative to mountings therefor and wherein tires on the wheels may be readily applied thereto and removed therefrom. It is further apparent that the rim sections are tightly locked and that no creeping or other undesired movements of the locking ring is permitted relative to the rim.

What I claim and desire to secure by Letters Patent is:

1. In combination with a rim comprising separable sections, a locking ring for connecting said sections comprising an expansible substantially circular split band, said band having a section pivoted to said band at one end thereof and removably engageable with the band at its other end to allow contraction of the ring.

2. A locking ring of the character described comprising a circular split band, said band having a section pivoted to said band at one end thereof and removably engageable with the band at its other end to allow contraction and expansion of the ring, said section having wedge portions tending to spread said band when in secured relation thereto.

3. A locking ring of the character described comprising a circular split band having recesses adjacent the split portion of the band, said band having a section pivoted to said band at one end and removably engageable with the band at its other end to allow separation of the split portions of the band and contraction and expansion of the ring, and means on said section engageable with said ring and recessed portions thereof for locking the ring in expanded condition.

4. A locking ring of the character described comprising a circular split band having recesses adjacent said split portion of the band, said band having a section pivoted to said band at one end thereof and removably engageable with the band at its other end to allow contraction and expansion of the ring, means on said section engageable with said ring and recessed portions thereof for locking the ring in expanded condition, and means on the ends of said sections for effecting a wedging action on said ring to expand the same.

JOHN R. MANNING.